Aug. 21, 1956     W. E. GLASSBURN     2,760,124

SWITCHING APPARATUS AND SYSTEMS

Filed May 17, 1952     2 Sheets-Sheet 1

WITNESSES:
Robert A. Baird
F. V. Giolma

INVENTOR
William E. Glassburn.
BY
Ralph H. Swingle
ATTORNEY

Aug. 21, 1956  W. E. GLASSBURN  2,760,124
SWITCHING APPARATUS AND SYSTEMS
Filed May 17, 1952  2 Sheets-Sheet 2

WITNESSES:
Robert C. Baird
F. V. Giolma

INVENTOR
William E. Glassburn.
BY
Ralph H. Swingle
ATTORNEY

United States Patent Office 2,760,124
Patented Aug. 21, 1956

2,760,124

SWITCHING APPARATUS AND SYSTEMS

William E. Glassburn, Bloomfield, N. J., assignor to Westinghouse Electric Corporation, East Pittsburgh, Pa., a corporation of Pennsylvania Application May 17, 1952, Serial No. 288,521

7 Claims. (Cl. 317—152)

My invention relates generally to switching apparatus and systems and it has reference in particular to switching apparatus and systems for controlling the connections of capacitors to an electrical circuit.

Generally stated, it is an object of my invention to provide capacitor switching apparatus which is simple and inexpensive to manufacture and is reliable and efficient in operation.

More specifically, it is an object of my invention to provide a compact and integrated control unit for controlling the connections of capacitors in a distribution system.

Another object of my invention is to provide for mounting a voltage sensitive control relay and an auxiliary control relay on a common plug-in type base in a weather-proof case for outdoor mounting with a bank of capacitors whose connections to an electric circuit are to be controlled.

Yet another object of my invention is to provide in a voltage sensitive relay of the induction type, for using a torque control winding on the magnetic core of the relay for increasing the contact closing torque of the relay when its contacts close.

It is also an important object of my invention to provide for mounting on a common base a modified form of voltage responsive induction relay and an auxiliary control relay therefor, together with a temperature compensating reactor and current limiting resistor so that all of the elements may be enclosed for outdoor operation by means of a clamp-on type glass cover.

Other objects will in part be obvious, and will in part be explained hereinafter.

In practicing my invention in accordance with one of its embodiments, a bank of capacitors is provided with an electrically operated switch for connecting them to and disconnecting them from a distribution circuit. Operation of the switch is effected by using a control relay for selectively energizing closing and trip windings of the switch. The control relay operates in response to operation of a contact-making voltage relay of the induction type which energizes the control relay or shunts it depending on whether the voltage of the circuit is low or high. The voltage relay is provided with torque control windings which are connected in circuit with the operating winding of the control relay to increase the contact closing torque of the relay. Both the voltage relay and the control relay are mounted on a common base secured to a plug-in type base mounted in a meter type socket, and are covered by a glass cover clamped to the base so as to provide a weather-proof unit for outdoor mounting.

For a more complete understanding of the nature and scope of my invention, reference may be made to the following detailed description, which may be read in connection with the accompanying drawings in which.

Figure 1:
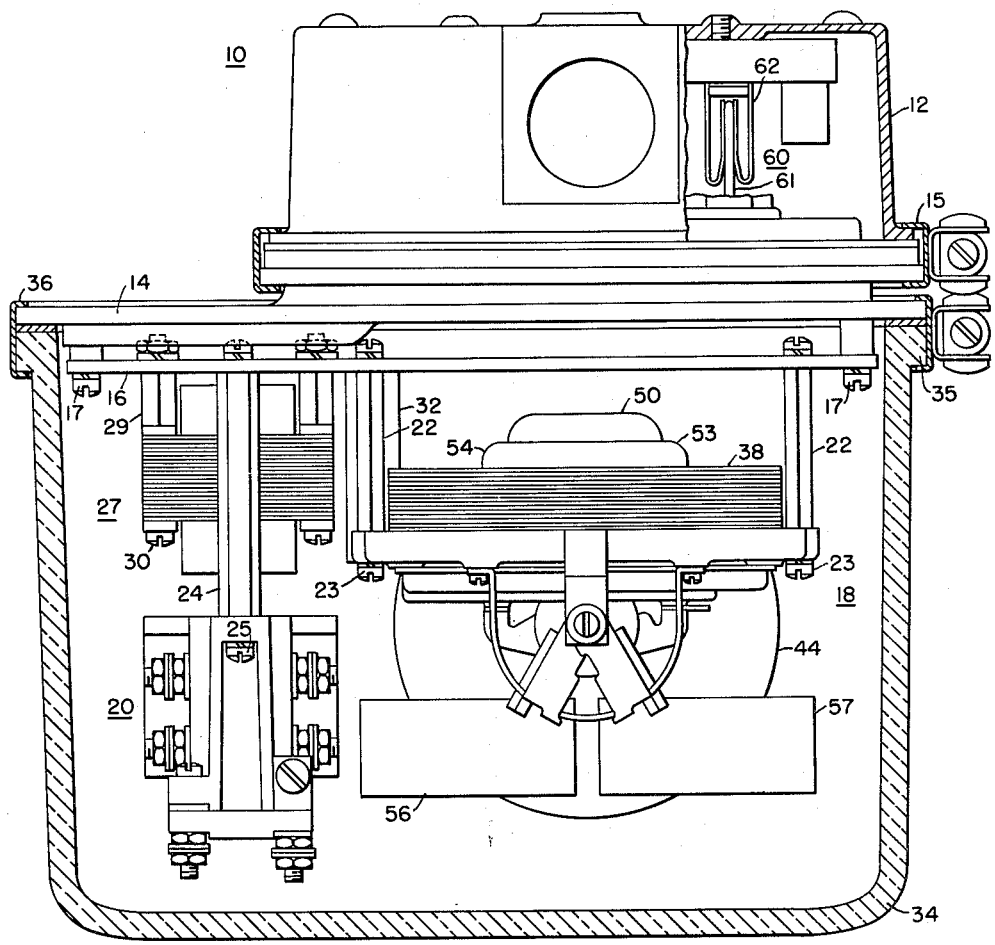
Figure 1 is a partly sectioned and partly broken away plan view of a switching unit embodying the invention in one of its forms.
Figure 2:
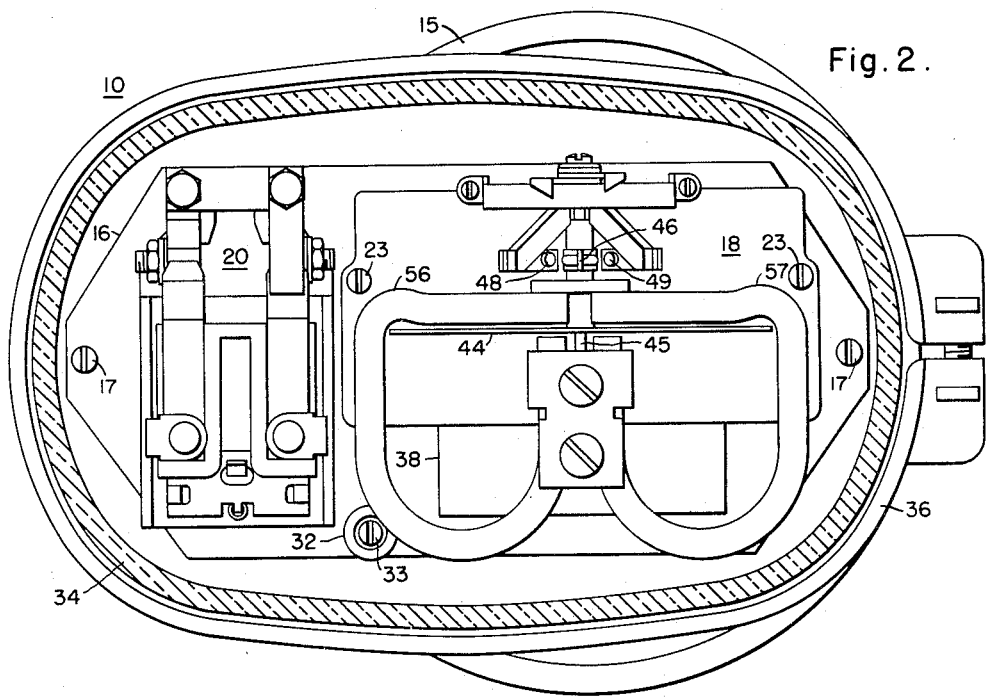
Fig. 2 is a partly sectioned front elevational view of the switching unit shown in Fig. 1.

Referring to Figs. 1 and 2, it will be seen that the switching unit 10 may comprise generally a cup-shaped socket 12 of a type similar to that used for plug-in type meters, having an elongated base 14 of the plug-in type secured thereto by a clamp ring 15. A sub-base 16 is secured by screws 17 to the base 14 for supporting a voltage responsive induction type relay 18 adjacent one end, and an auxiliary control relay 20 adjacent the other end. The voltage responsive relay 18 may be secured to the sub-base 16 by means of spacers 22 and screws 23. The auxiliary control relay 20 may likewise be secured to the sub-base 16 adjacent the other end thereof, and in spaced relation thereto by means of spacers 24 and screws 25. A reactor 27 may be mounted on the sub-base 16 between the control relay 20 and the sub-base by means of spacers 29 and screws 30. A current limiting resistor 32 may be mounted on the sub-base 16 intermediate the control relay 20 and the voltage responsive relay 18 by means of a screw 33. A glass cover 34 having a peripheral flange 35 may be secured to the base 14 by means of a clamp ring 36, so as to protect the switching unit from the weather.

Figure 3:
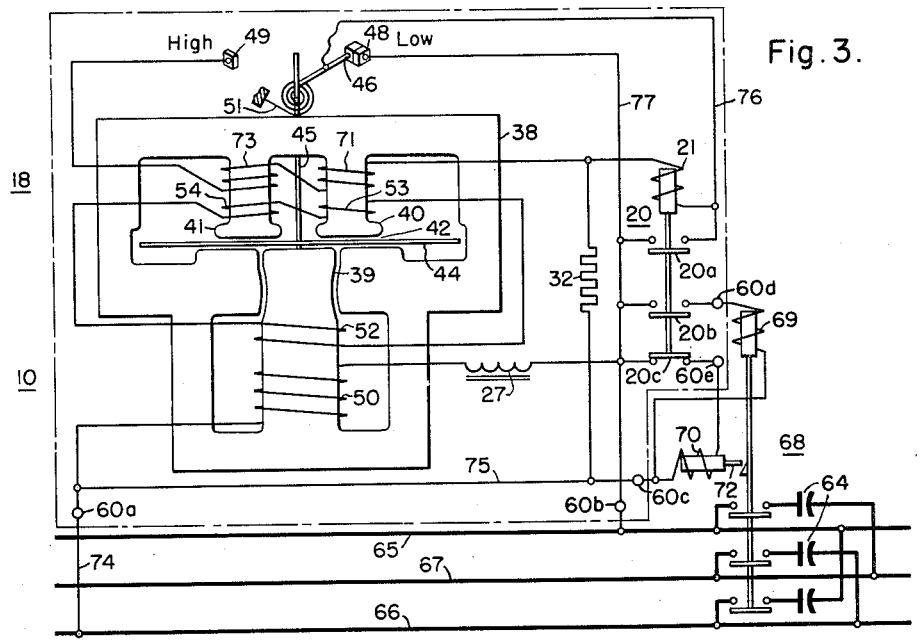
Fig. 3 is a diagrammatic view of a capacitor switching system utilizing the invention in one of its forms.

The voltage responsive relay 18 may be of the induction type comprising, as shown in Figs. 1, 2 and in particular, in Fig. 3, a closed magnetic core 38 having inwardly projecting main and auxiliary pole pieces 39, 40 and 41 defining between them an air gap 42 in which is disposed a contact actuating element such as the aluminum disc 44, which may be rotatably mounted by means of a shaft 45 for actuating a movable contact arm 46 for engaging adjustable stationary contact members 48 and 49 at the opposite ends of its travel. A main operating winding 50 may be disposed on the main pole member 39 for connection in series circuit with the reactor 27, which serves to compensate for changes in ambient temperature, to a source of electrical energy, in accordance with the voltage of which a switching operation is to be responsive. Auxiliary windings 52, 53 and 54 may be disposed on the main pole member and the auxiliary pole members, respectively. These windings may be connected in series circuit relation for producing a magnetic flux in the air gap by transformer action from the main operating winding. This flux will be displaced in phase relation with the flux produced in the air gap by the main operating winding 50 so as to provide a contact actuating torque by induction on the disc 44. Damping magnets 56 and 57 (Figs. 1 and 2) may be supported so as to provide a permanent magnet flux through a portion of the disc 44 for retarding movement of the disc. Connections to the switching elements mounted on the sub-base 16 may be made by means of terminal connections 60 such as shown in Fig. 1, which comprise a knife blade contact 61 projecting from the base 14 and making contact with a cooperating stationary contact 62 (only one pair of such contacts being shown in Fig. 1).

Referring to Fig. 3, it will be seen that a plurality of capacitors 64 may be disposed for connection to the conductors 65, 66 and 67 of a three phase alternating current distribution circuit by means of a circuit breaker or switch 68 having a closing winding 69 for operating the switch to the closed position and a trip winding 70 for releasing a trip element 72 to open the switch. Operation of the switch 68 may be controlled by means of the control relay 20 of the switching unit 10. External connections may be made to the elements of unit 10 through terminal connections 60a, 60b, 60c, 60d and 60e, similar to the connection 60 of Fig. 1. The operating winding 21 of the auxiliary control relay may be selectively connected to the conductors 65 and 66, and shunted, by means of the moving contact member 46 which selectively engages the stationary contact 48 or the contact 49, depending on whether the voltage of the circuit conductors 65 and 66 is below or above a predetermined value.

In order to provide for increasing the contact pressure between the moving contact member 46 and the high voltage stationary contact member 49 to insure maintenance of the shunting circuit around the operating winding 21 when the auxiliary control relay is being deenergized to open the switch 68, torque control windings 71 and 73 may be provided on the auxiliary pole members 40 and 41, and connected in shunt relation with the operating winding 21 through contact members 46 and 49 of the voltage responsive relay 18 in such manner as to provide for increasing the torque effect of the main operating winding 50 when the moving contact 46 engages the stationary contact 49.

When the voltage of the conductors 65 and 66 drops below a predetermined value, the energization of the main operating winding 50 which is connected to the conductors through the reactance device 27 decreases. Accordingly, the torque tending to rotate the disc 44 in a counterclockwise direction decreases and the spring 51 rotates the disc in a clockwise direction and returns the moving contact member 46 toward the low voltage contact 48. Upon engagement of contacts 46 and 48 an energizing circuit is provided for the operating winding 21 of the auxiliary relay 20, extending from conductor 66 through conductor 74, conductor 75, current limiting resistor 32, operating winding 21, conductor 76, contact member 46, contact member 48, and conductor 77 back to conductor 65. The control relay 21 operates to the energized position, completing an obvious energizing circuit for the operating winding 69 of the switch 68 through contact member 20b, causing the switch 68 to close and connect the capacitor 64 to the distribution circuit. A holding circuit is provided for relay 20 through contact 20a.

When the voltage of the distribution circuit rises above a predetermined value, the energization of the main operating winding 50 increases, increasing the counterclockwise torque on the disc 44, so that the spring 51 is no longer effective to rotate the moving contact member 46 in a clockwise direction but instead contact member moves in a counterclockwise direction for engaging the stationary contact 49. A shunting circuit is thereupon provided around the operating winding 21 of the switch 20, through auxiliary control windings 71 and 73, contact member 49, contact member 46, and conductor 76. The control relay 20 will thereupon be shunted, the energization of the control windings 71 and 73 serving to further increase the counterclockwise torque acting on the disc 44, to increase the contact pressure between the contacts 46 and 49 to insure maintenance of the shunting circuit until the control relay returns to the deenergized position.

Upon deenergization of the control relay 20, an energizing circuit is completed for the trip winding 70 through contact member 20c and the switch 68 is opened, disconnecting the capacitor 64 from the distribution circuit.

Figure 4:
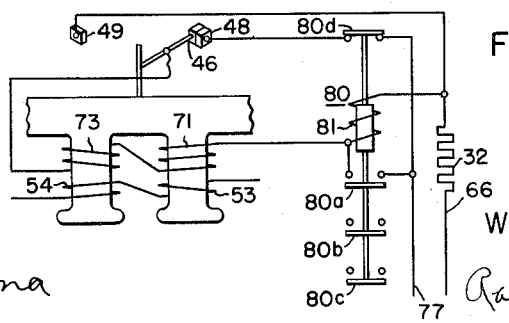
Fig. 4 is a partial diagrammatic view of a portion of a capacitor switching system utilizing the invention in another of its forms and which may be substituted for the corresponding portion of the system shown in Fig. 3.

Referring to Fig. 4, it will be seen that the control relay 20 may be replaced by a similar control relay 80, having in addition to contact members 80b and 80c corresponding to contact members 20b and 20c controlling the energization of the closing and trip windings 69 and 70 of the switch 68, and contact member 80a corresponding to contact member 20a, an additional contact member 80d for selectively connecting the control windings 71 and 73 to be energized in opposite senses, depending on whether the moving contact 46 engages the stationary contact 48 or the stationary contact 49.

For example, when the stationary contact 46 engages contact 48, the control windings 71 and 73 may be connected to the conductors 65 and 66 in series with winding 81 of the relay 80, with the winding 73 being connected to the conductor 77 through contact 80d. When the moving contact 46 engages the stationary contact 49, the control windings 71 and 73 will be connected to the source conductors 65 and 66 in shunt with winding 81, with the winding 73 connected to the conductor 66 through contact member 49 and resistor 32, thus reversing its phase relation relative to the main operating winding 50 of the voltage responsive relay which remains permanently connected to the conductors 65 and 66. Thus, the net torque on the disc 44 will be varied in opposite senses when the contact arm 46 engages the stationary contacts 48 and 49, so as to increase the contact pressure in each instance.

By utilizing the teachings of my invention a simple and inexpensive switching unit is provided which is both compact and reliable. Such a unit may be readily mounted outdoors immediately adjacent pole-mounted capacitors and their operating switch, thus providing a compact and reliable switching system. A switching unit embodying the features of my invention utilizes elements which are largely standard and are easily obtainable. The mounting socket for the unit is substantially identical with that of many well known plug-in type meter sockets, and the glass cover is of a type such as is used with polyphase watthour meters. The cover may be easily removed for obtaining access to the switching unit for servicing and adjustment. While the system has been described in connection with a three phase circuit, it is obvious that it may readily be used in single phase circuits.

Since certain changes may be made in the above-described constructions and different embodiments of the invention may be made without departing from the spirit and scope thereof, it is intended that all the matter contained in the above description and shown in the accompanying drawings, shall be considered as illustrative and not in a limiting sense.

I claim as my invention:

1. In switching apparatus, a voltage responsive relay of the induction type having a core structure with a main operating winding and auxiliary windings for producing an operating torque on a contact operating element, an additional winding on the core structure of said relay, a control relay operable in response to the contact element of the voltage responsive relay, contact means actuated by said relay, and a circuit including said contact means connecting the additional winding in shunt with the control relay to supply electrical energy to the additional winding to vary the operating torque of the voltage responsive relay in response to operation of said contact element.

2. Switching apparatus comprising, an induction type relay having a magnetic core with main and auxiliary pole pieces having main and auxiliary windings respectively for producing an operating torque in a metal disc for actuating a movable contact, an additional winding on the auxiliary pole pieces of said core, an auxiliary relay having an operating winding and contacts operable in response to energization and deenergization of said winding, a circuit including the contact of the induction type relay for connecting the operating winding to a source of electrical energy in a given position of the disc, and an additional circuit including the contact of the induction type relay for effectively reducing the energization of said operating winding and connecting the additional winding for energization in a sense to increase the operating torque actuating the contact to complete said additional circuit.

3. Switching apparatus comprising, a common support, an induction-type relay mounted on said support and having a movable contact arm actuated by an induction disc in response to a torque produced by magnetic fields from main and auxiliary windings on a magnetic core having main and auxiliary pole structures, an additional winding on said auxiliary core, a control relay mounted on said support and having an operating winding, a circuit for connecting said winding to a source of electrical energy through the movable contact in one of its positions, said relay having a contact in circuit with its operating winding, an additional circuit including the additional winding for connecting a shunt around the operating winding, and reactance means connected in circuit with the main winding.

4. Switching apparatus comprising; a common support; a voltage sensitive relay mounted on said support having a moving contact normally biased to engage one stationary contact in one position and a magnetic core having a main pole structure with a main operating winding thereon for effecting movement of said contact to engage another stationary contact in another position, and an auxiliary pole structure with an auxiliary winding thereon connected to an auxiliary winding on the main pole; an additional winding on said auxiliary pole structure, an auxiliary relay mounted on the support in spaced relation therewith and having contact means and an operating winding, a circuit including said another stationary contact connecting said additional winding in shunt wth said operating winding, an impedance device mounted on said support between the auxiliary relay and the support, another circuit connecting the main operating winding and the impedance device to a source of electrical energy, an additional circuit including said one stationary contact connecting the operating winding to a source of electrical energy, and circuit means including the relay contact means for disconnecting the operating winding and auxiliary winding from said source.

5. In switching apparatus, a voltage responsive relay having a moving contact for engaging different stationary contacts in different positions, said relay contact being biased against one of said contacts, and said relay having main and auxiliary operating windings for actuating the moving contact from one position to another and an additional winding for varying the actuating effect of the auxiliary windings on the moving contact, means including an auxiliary relay having an operating winding and a plurality of contacts including one contact for providing a holding circuit for the operating winding of the auxiliary relay, a circuit including one of the stationary contacts connecting the operating winding of the auxiliary relay to provide an energizing circuit therefor, and another circuit connecting the additional winding in shunt with said auxiliary relay operating winding while said one contact is closed to oppose the torque of the main operating winding.

6. Switching apparatus comprising, a control relay, a closed magnetic core having inwardly projecting main and auxiliary pole pieces defining an air gap, a disc element in said gap, a moving contact arm actuated by the disc element to engage one or the other of two stationary contacts, a spring biasing the contact to engage one of said stationary contacts to provide for energizing the control relay, a main winding on the main pole piece, auxiliary windings on the main and auxiliary pole pieces connected together for producing a magnetic flux displaced from that of the main winding, a control winding on the auxiliary pole pieces, and circuit means connecting the control winding in shunt with the control relay for energization through the contact arm and the other of the stationary contacts to vary the torque on the disc element.

7. In combination, a switch having a closing winding and a trip winding for operating the switch, means including a control relay for selectively connecting the closing and trip windings to a source of electrical energy, said control relay having normally open contacts, a voltage responsive relay having a contact member for effecting operation of the control relay and an operating winding for actuating said contact member, an auxiliary winding on the voltage responsive relay, and a circuit connecting the auxiliary winding through said contact member and normally open contacts to vary the effect of said operating winding on the contact member only while the control relay is energized.

References Cited in the file of this patent
UNITED STATES PATENTS

| | | |
|---|---|---|
| 1,286,239 | Copley | Dec. 3, 1918 |
| 1,893,179 | Parsons | Jan. 3, 1933 |
| 2,254,039 | Kovalsky | Aug. 26, 1941 |
| 2,333,520 | Carlin | Nov. 2, 1943 |
| 2,615,962 | Cuttino | Oct. 28, 1952 |
| 2,680,832 | Schultz | June 8, 1954 |
| 2,697,803 | Eadie | Dec. 21, 1954 |